United States Patent
Fukushima et al.

(10) Patent No.: US 10,622,613 B2
(45) Date of Patent: Apr. 14, 2020

(54) CONNECTION MODULE INCLUDING AN EXTERNAL CONNECTION BUS BAR AND INSULATING PROTECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naoki Fukushima, Mie (JP); Osamu Nakayama, Mie (JP); Katsushi Miyazaki, Mie (JP); Tetsuya Fujita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/401,670

(22) Filed: May 2, 2019

(65) Prior Publication Data

US 2019/0355957 A1  Nov. 21, 2019

(30) Foreign Application Priority Data

May 21, 2018 (JP) ................................ 2018-096993

(51) Int. Cl.
*H01M 2/20* (2006.01)
*H01R 25/16* (2006.01)

(52) U.S. Cl.
CPC .......... *H01M 2/206* (2013.01); *H01R 25/162* (2013.01); *H01M 2220/20* (2013.01); *H01R 2201/26* (2013.01)

(58) Field of Classification Search
CPC .............. H01M 2/206; H01M 2220/20; H01R 25/162; H01R 2201/26
See application file for complete search history.

(56) References Cited

U.S. PATENT DOCUMENTS 9,660,243 B2 * 5/2017 Nakayama .......... H01M 2/1077
9,780,351 B2 * 10/2017 Shimoda ................. B60L 58/21
(Continued)

FOREIGN PATENT DOCUMENTS

JP        2014-127229        7/2014

*Primary Examiner* — Abdullah A Riyami
*Assistant Examiner* — Nader J Alhawamdeh
(74) *Attorney, Agent, or Firm* — Greenblum & Bernstein, P.L.C.

(57) ABSTRACT

Provided is a technique that prevents impairment of attachability of an external connection bus bar. The present specification discloses a connection module to be attached to a power storage element group constituted by a plurality of power storage elements each having positive and negative electrode terminals and arranged side by side, the connection module including: a negative-electrode external connection bus bar that includes a plate-shaped extension portion and is configured to be electrically connected to an electrode terminal; and a second protector that holds the negative-electrode external connection bus bar. The second protector includes a placement portion on which the extension portion is placed and a locking portion that has a locking surface facing the placement portion, and the extension portion is provided with an extended locking piece 49 that extends from the extension portion toward the locking surface.

4 Claims, 9 Drawing Sheets

(56) References Cited

U.S. PATENT DOCUMENTS

2016/0197330 A1* 7/2016 Takase .................. H01M 2/206
                                                              429/92
2016/0254515 A1* 9/2016 Shimoda ............... H01M 2/206
                                                              429/61
2017/0294640 A1* 10/2017 Fukushima ......... H01M 2/1077
2018/0315975 A1* 11/2018 Nakayama ............. H01R 4/029
2019/0051883 A1* 2/2019 Fukushima ........... H01M 2/206
2019/0288447 A1* 9/2019 Shimizu ................. H01M 2/10

* cited by examiner

CONNECTION MODULE INCLUDING AN EXTERNAL CONNECTION BUS BAR AND INSULATING PROTECTOR

TECHNICAL FIELD

The present specification discloses a technique relating to a connection module.

BACKGROUND ART

A power storage module disclosed in JP 2014-127229A (Patent Document 1 below) is known as an example of a conventional power storage module that includes external connection bus bars connected to output electrode terminals of a power storage element group. A pair of output electrode terminals are provided at two ends of the power storage element group of this power storage module, and the external connection bus bars are connected to the pair of output electrode terminals, respectively. Each of the external connection bus bars is held by a locking piece or the like provided on a resin protector together with bus bars that connect electrode terminals of power storage elements.

JP 2014-127229A is an example of related art.

SUMMARY OF THE INVENTION

However, when electric power is supplied from an end of the power storage element group, an external connection bus bar that is connected to one of the pair of output electrode terminals needs to be disposed extending to the other end of the power storage element group.

However, in the case where the plate thickness of the external connection bus bar is small relative to the width dimension and the external connection bus bar tends to deform such that both end portions in the width direction approach each other, when the external connection bus bar is being attached to the locking piece of the resin protector, the external connection bus bar may be deformed by the locking piece and attachability may be impaired.

The present specification discloses a technique that prevents impairment of attachability of an external connection bus bar.

The technique disclosed in the present specification relates to a connection module to be attached to a power storage element group that is constituted by a plurality of power storage elements that each have positive and negative electrode terminals and are arranged side by side, the connection module including: an external connection bus bar that includes a plate-shaped extension portion extending in an arrangement direction of the power storage elements and is configured to be electrically connected to one of the electrode terminals that is located at an end portion in the arrangement direction of the power storage elements in the power storage element group; and an insulating protector that holds the external connection bus bar, wherein the insulating protector includes a placement portion on which the extension portion is placed and a locking portion that has a locking surface facing the placement portion, and the extension portion is provided with an extended locking piece that extends from the extension portion toward the locking surface of the locking portion and that is locked with the locking surface in a direction in which the external connection bus bar separates from the insulating protector.

According to the above-described configuration of the connection module, rigidity in the plate thickness direction is increased in a part of the extension portion where the extended locking piece is provided, and therefore it is possible to keep the extended locking piece from largely inclining relative to the locking surface of the locking portion and strengthen the lock between the locking surface and the extended locking piece. That is, the extension portion can be kept from being flexurally deformed by the locking portion of the insulating protector. As a result, it is possible to prevent impairment of attachability of the external connection bus bar to the insulating protector and keep the external connection bus bar from coming off from the insulating protector.

The connection module disclosed in the present specification may have the following configuration. The locking portion includes: an elastic piece that extends from the placement portion in a direction perpendicular to a placement surface of the placement portion and is capable of being elastically displaced in a direction along the placement surface; and a locking projection that has the locking surface and projects from the elastic piece, and the extended locking piece extends along the elastic piece in a direction perpendicular to a plate surface of the extension portion in the vicinity of the elastic piece.

According to this configuration, the extended locking piece is disposed along the elastic piece of the locking portion in the vicinity thereof, and therefore when the extension portion is to flexurally deform, the extended locking piece comes into contact with the elastic piece of the locking portion, whereby flexural deformation of the extension portion is prevented. As a result, it is possible to further prevent impairment of attachability of the external connection bus bar to the insulating protector, and the external connection bus bar can be further kept from coming off from the insulating protector.

It is possible to employ a configuration in which the extended locking piece is continuous with a side edge of the extension portion in a width direction perpendicular to an extension direction of the extension portion, and a portion of the extended locking piece that is continuous with the extension portion is a bent portion that is bent to have a round corner and comes into contact with the locking projection of the locking portion when the external connection bus bar is being attached to the insulating protector.

According to this configuration, when the external connection bus bar is being attached to the insulating protector, the bent portion having a round corner comes into contact with the locking portion to elastically displace the elastic piece, and therefore as compared with, for example, a case where the bent portion has an angular corner, the extended locking piece of the external connection bus bar can be smoothly attached to the locking portion of the insulating protector and attachability of the external connection bus bar to the insulating protector can be improved. Also, as a result of the extended locking piece of the external connection bus bar being smoothly attached to the locking portion, the locking portion can be kept from being damaged. Therefore, the external connection bus bar can be kept from coming off from the insulating protector as a result of the locking portion being damaged.

It is possible to employ a configuration in which the extension portion includes a locking hole to which a fit-locking piece provided in the placement portion is fitted and a protruding portion that is provided on a side of the locking hole and protrudes in a width direction by a protrusion dimension equal to or greater than a width dimension of the locking hole in the width direction, and an extension dimension of the extended locking piece is equal to or less than the protrusion dimension of the protruding portion.

When a hole or the like is provided in the extension portion, the area of a widthwise cross section of the extension portion decreases, and therefore the area of the widthwise cross section of the extension portion can be maintained by providing the protruding portion that protrudes in the width direction on a side of the locking hole. Further, in a laid-out state of the external connection bus bar in which the bent portion is not yet bent, the extended locking piece has a dimension equal to or less than the protrusion dimension of the protruding portion.

That is, when the protruding portion provided for maintaining the area of the widthwise cross section of the extension portion is formed through punching or the like, the extended locking piece can be formed by effectively utilizing a portion that would otherwise have been wasted. As a result, wasting of the material can be reduced as compared with a case where the extended locking piece is formed from a part of the base material other than a portion to be wasted, such as a case where the extension dimension of the extended locking piece is greater than the protrusion dimension of the protruding portion, and thus the yield of the external connection bus bar can be improved.

According to the technique disclosed in the present specification, it is possible to prevent impairment of attachability of the external connection bus bar.

EMBODIMENTS OF THE INVENTION

Embodiment

The following describes an embodiment of the technique disclosed in the present specification with reference to FIGS. 1 to 10.

Figure 1:
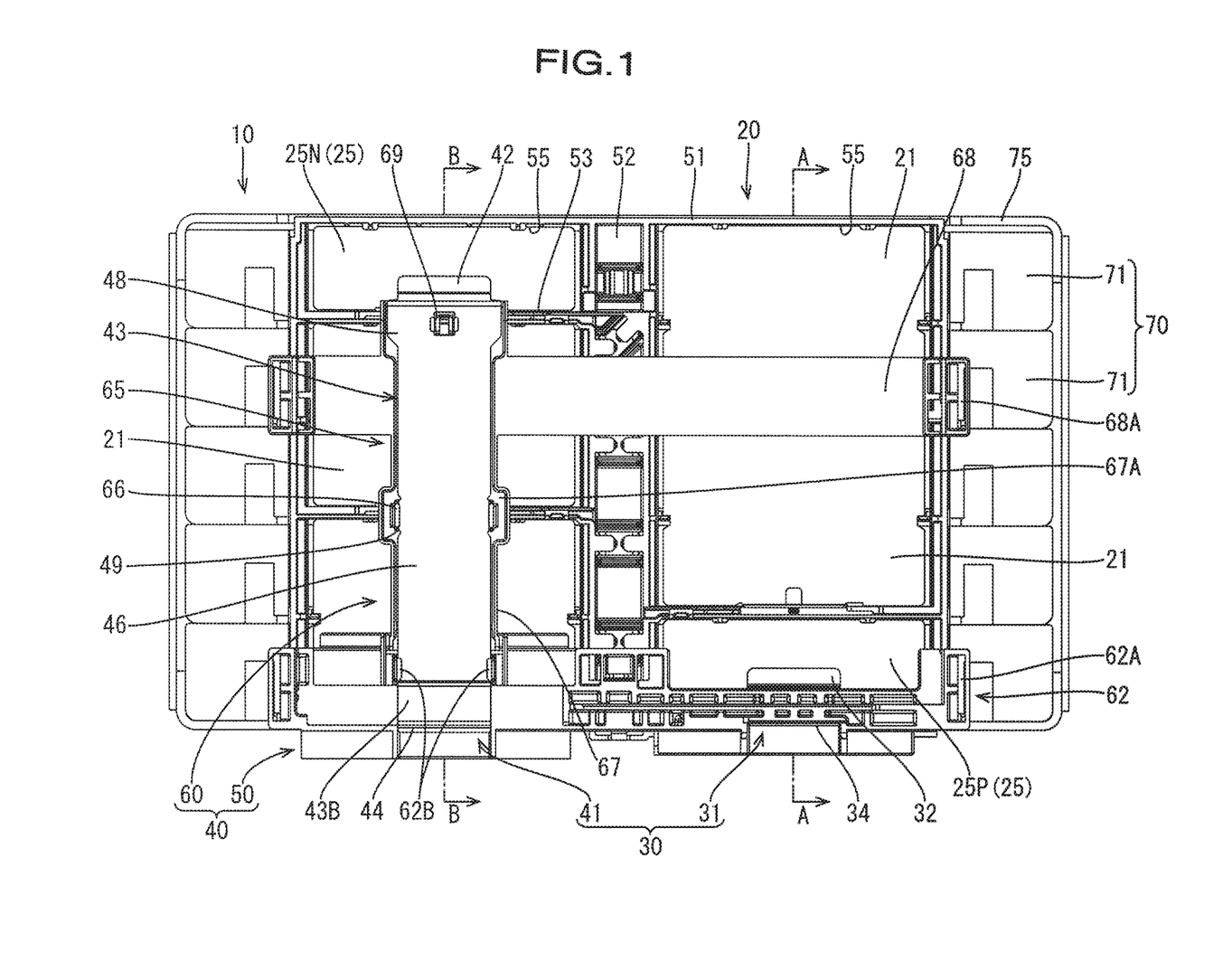
FIG. 1 is a plan view of a power storage module.
Figure 2:
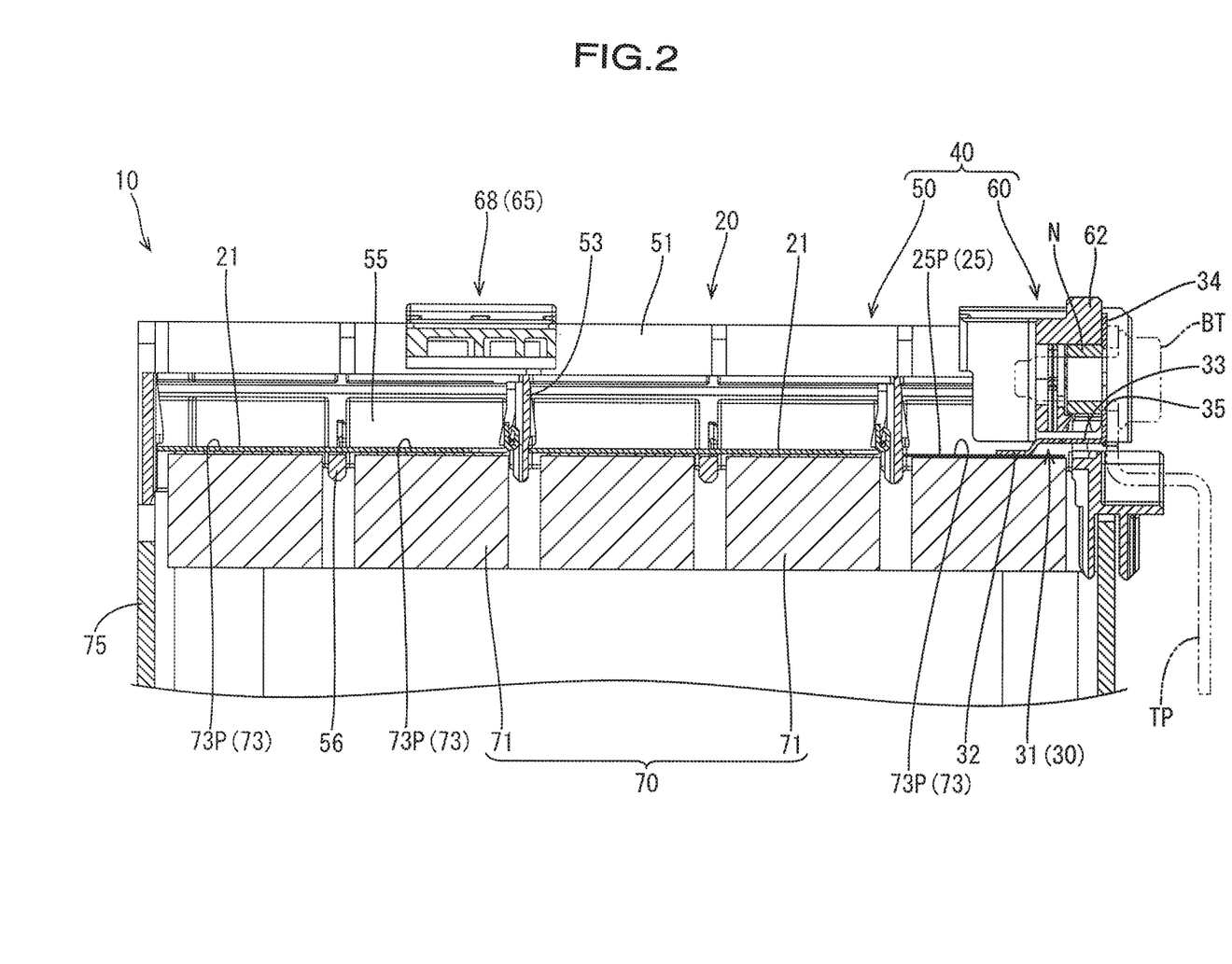
FIG. 2 is a cross-sectional view taken along a line A-A in FIG. 1.
Figure 3:
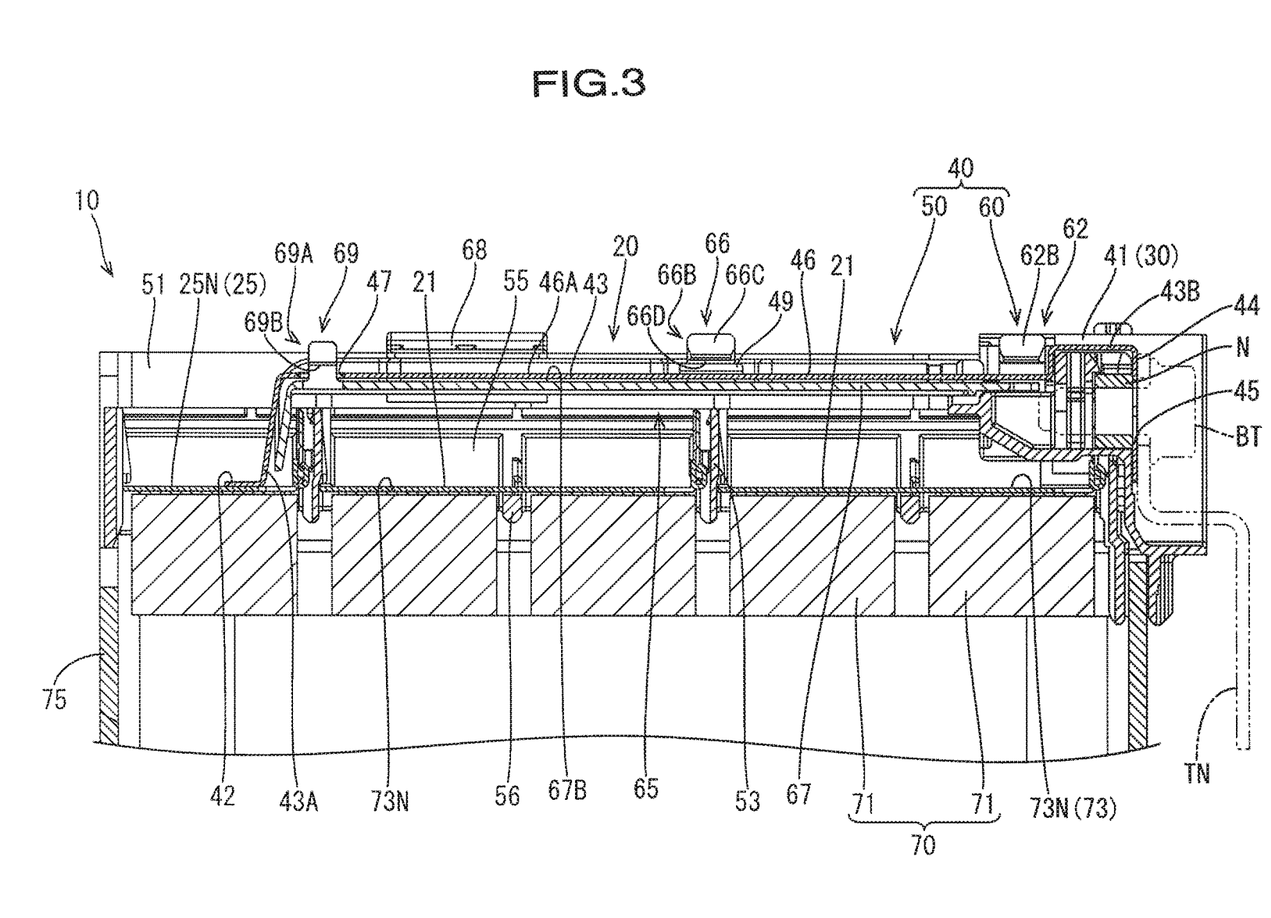
FIG. 3 is a cross-sectional view taken along a line B-B in FIG. 1.

The present embodiment describes, as an example, a power storage module 10 that is installed in a vehicle such as an electric automobile or hybrid automobile and used as a power source for driving the vehicle. As illustrated in FIGS. 1 to 3, the power storage module 10 includes a power storage element group 70 that is constituted by a plurality of power storage elements 71 arranged side by side and a connection module 20 that is attached to the power storage element group 70.

Figure 6:
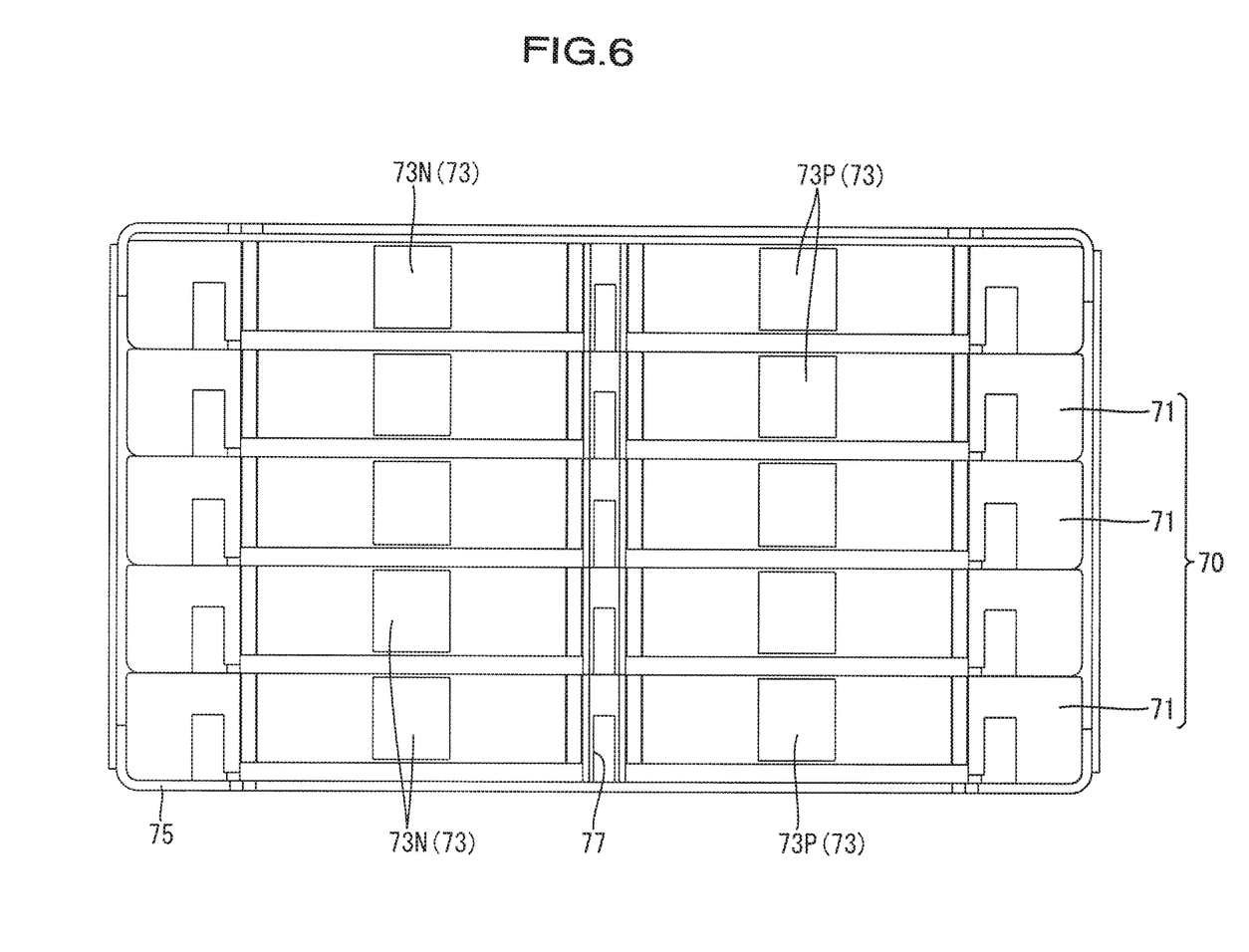
FIG. 6 is a plan view of a power storage element group.

Each of the power storage elements 71 is, for example, a secondary battery, and, as illustrated in FIG. 6, the power storage element group 70 is constituted by a plurality of (five in the present embodiment) power storage elements 71 housed in a frame 75 that is substantially rectangular in a plan view.

As illustrated in FIG. 6, a pair of flat electrode terminals 73 are disposed on an upper surface of each power storage element 71 at positions near respective ends in the left-right direction. One of the electrode terminals 73 is a positive electrode terminal 73P and the other is a negative electrode terminal 73N.

As illustrated in FIG. 6, the power storage elements 71 are housed in the frame 75 so as to be lined up in the front-rear direction such that electrode terminals 73 of different polarities are adjacent to each other in two power storage elements 71 that are adjacent in the front-rear direction (that is, a positive electrode terminal 73P of one of the adjacent power storage elements 71 and a negative electrode terminal 73N of the other power storage element 71 are adjacent to each other).

As illustrated in FIG. 6, a to-be-locked portion 77 to which non-illustrated fit-locking portions provided in the connection module 20 are to be fitted is provided between each pair of electrode terminals 73 disposed on the top of each power storage element 71. When the fit-locking portions are fitted to the to-be-locked portion 77 and the fit-locking portions and the to-be-locked portion 77 are locked in the up-down direction, the connection module 20 is fixedly held above the power storage element group 70.

As illustrated in FIGS. 1 to 3, the connection module 20 includes: a plurality of bus bars 21 that each connect a positive electrode terminal 73P and a negative electrode terminal 73N of power storage elements 71 that are adjacent in the front-rear direction; end bus bars 25 that are each connected to one of electrode terminals 73 that are located at the front and rear ends in the arrangement direction of the power storage elements 71 of the power storage element group 70; a pair of external connection bus bars 30 that are connected to the end bus bars 25 and to which a non-illustrated external device is to be connected; and an insulating protector 40 that holds these bus bars 21 and 41 while insulating the bus bars 21 and 41 from each other.

Figure 4:
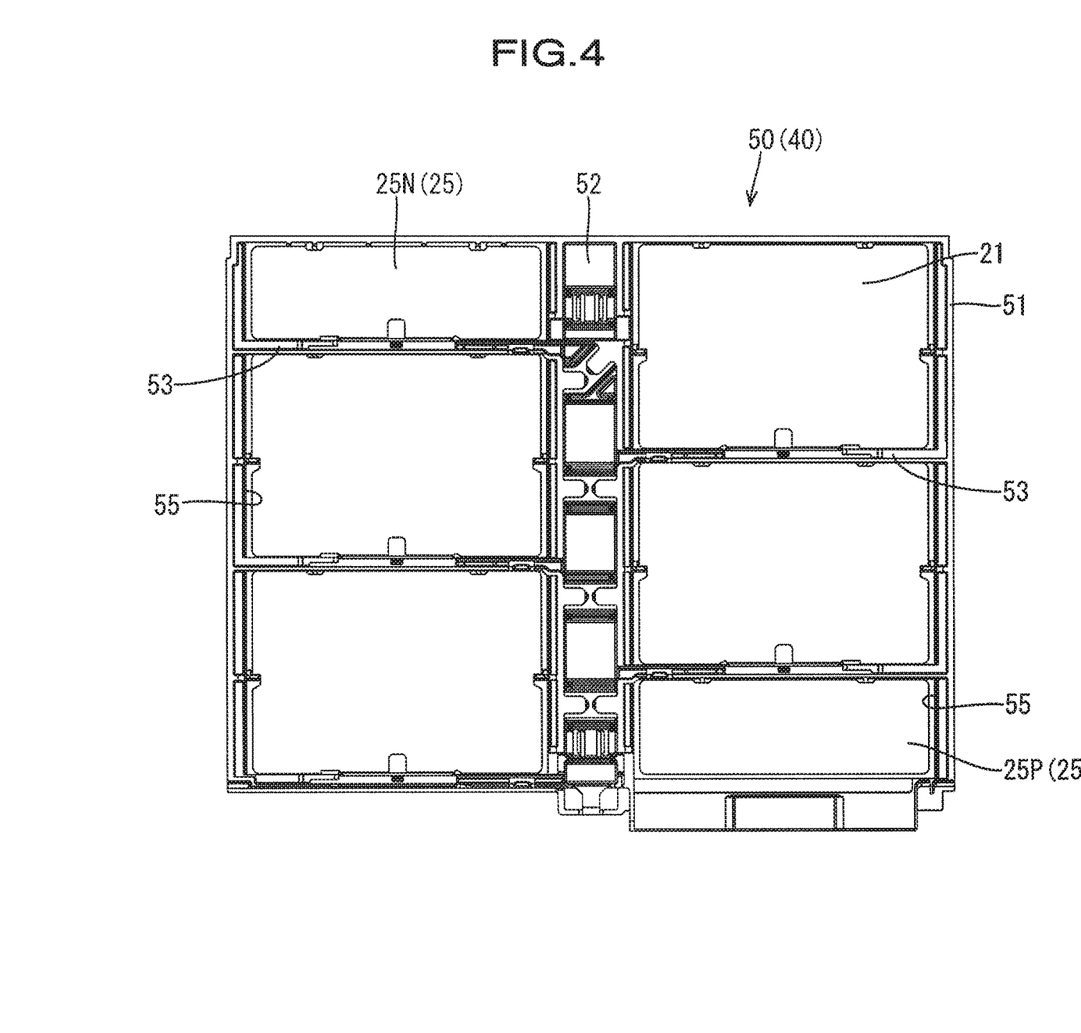
FIG. 4 is a plan view of a first protector to which bus bars are attached.

Each of the bus bars 21 is formed, for example, by pressing a plate of metal that has excellent electric conductivity such as copper, a copper alloy, aluminum, an aluminum alloy, or stainless steel (SUS), or a metal plate obtained by sticking together an aluminum plate and a copper plate, to have the shape of a substantially rectangular plate that is slightly elongated in the left-right direction (see FIG. 4).

As illustrated in FIGS. 2 and 3, each bus bar 21 is large enough that it is placed on electrode terminals 73 of power storage elements 71 that are adjacent in the front-rear direction, spanning from an electrode terminal 73 of one of the adjacent power storage elements 71 to an electrode terminal 73 of the other power storage element 71, and as a result of end portions of the bus bar 21 in the front-rear direction being electrically connected to the respective electrode terminals 73 through welding or the like, the bus bar 21 serially connects the adjacent power storage elements 71.

Note that, in the present embodiment, the adjacent power storage elements 71 are serially connected by arranging the adjacent power storage elements 71 such that electrode terminals 73 of different polarities are adjacent to each other. However, some adjacent power storage elements 71 of the power storage element group 70 may be connected in parallel by arranging the adjacent power storage elements 71 such that electrode terminals 73 of the same polarity are adjacent to each other.

Each of the end bus bars 25 is formed, for example, by pressing a plate of metal that has excellent electric conductivity such as copper, a copper alloy, aluminum, an aluminum alloy, or stainless steel (SUS) to have the shape of a substantially rectangular plate that is elongated in the left-right direction, and as illustrated in FIG. 4, the length dimension of the end bus bars 25 in the front-rear direction is approximately half of that of the bus bars 21. In the present embodiment, the end bus bars 25 are respectively located at the rear left end and the front right end, where the end bus bar 25 located at the rear left end is a negative-electrode end bus bar 25N that is connected to the negative electrode terminal 73N of the power storage element 71 located at the rear end, and the end bus bar 25 located at the front right end is a positive-electrode end bus bar 25P that is connected to the positive electrode terminal 73P of the power storage element 71 located at the front end.

One of the pair of external connection bus bars 30 is a positive-electrode external connection bus bar 31 that is short in the front-rear direction, and the other of the pair of external connection bus bars 30 is a negative-electrode external connection bus bar (an example of "external connection member") 41 that is long in the front-rear direction. In the present embodiment, the positive-electrode external connection bus bar 31 is located on the right as illustrated in FIGS. 1 and 2, and the negative-electrode external connection bus bar 41 is located on the left as illustrated in FIGS. 1 and 3.

As illustrated in FIGS. 1 and 2, the positive-electrode external connection bus bar 31 includes: a first bus bar connecting portion 32 that is connected to the positive-electrode end bus bar 25P of the power storage element group 70; a first terminal connecting portion 34 that is fastened to a positive electrode terminal TP provided on a non-illustrated external device using a bolt; and a short linkage portion 33 that connects the first bus bar connecting portion 32 and the first terminal connecting portion 34.

The short linkage portion 33 is formed continuously from the front edge of the first bus bar connecting portion 32 to be located at a position higher than the first bus bar connecting portion 32. On the other hand, the first terminal connecting portion 34 is formed continuously from the front edge of the short linkage portion 33 to extend upward from the front edge of the short linkage portion 33.

The first bus bar connecting portion 32 is disposed on the positive-electrode end bus bar 25P such that it extends along an upper surface of the positive-electrode end bus bar 25P and is electrically connected to the positive-electrode end bus bar 25P through welding or the like. Accordingly, when the connection module 20 is attached to the power storage element group 70 and the plurality of power storage elements 71 are serially connected by the bus bars 21, electric power from a positive electrode of the power storage element group 70 is output via the positive-electrode end bus bar 25P to the positive-electrode external connection bus bar 31.

The first terminal connecting portion 34 is disposed along a front face of the insulating protector 40, and the first terminal connecting portion 34 has a bolt hole 35 into which a fastening bolt BT can be inserted.

As illustrated in FIGS. 1 and 3, the negative-electrode external connection bus bar 41 includes: a second bus bar connecting portion 42 that is connected to an upper surface of the negative-electrode end bus bar 25N of the power storage element group 70; a second terminal connecting portion 44 that is fastened to a negative electrode terminal TN provided on the non-illustrated external device using a bolt; and a long linkage portion 43 that connects the second bus bar connecting portion 42 and the second terminal connecting portion 44.

The second bus bar connecting portion 42 is disposed on the negative-electrode end bus bar 25N such that it extends along the upper surface of the negative-electrode end bus bar 25N, and is electrically connected to the negative-electrode end bus bar 25N through welding or the like. Accordingly, when the connection module 20 is attached to the power storage element group 70 and the plurality of power storage elements 71 are serially connected by the bus bars 21, electric power from a negative electrode of the power storage element group 70 is output via the negative-electrode end bus bar 25N to the negative-electrode external connection bus bar 41.

The second terminal connecting portion 44 is disposed along the front face of the insulating protector 40, and the second terminal connecting portion 44 has a bolt hole 45 into which a fastening bolt BT can be inserted.

The long linkage portion 43 is longer than the short linkage portion 33 and extends in the front-rear direction from the position of the negative-electrode end bus bar 25N to the end portion on the side where the positive-electrode end bus bar 25P is located. As illustrated in FIG. 3, the long linkage portion 43 includes: an inclined portion 43A that extends from the front edge of the second bus bar connecting portion 42 to a position higher than the short linkage portion 33 while being inclined diagonally forward; an extension portion 46 that extends forward from the front edge of the inclined portion 43A; and an L-shaped portion 43B that extends upward from the front edge of the extension portion 46 and is bent to extend forward.

Figure 9:
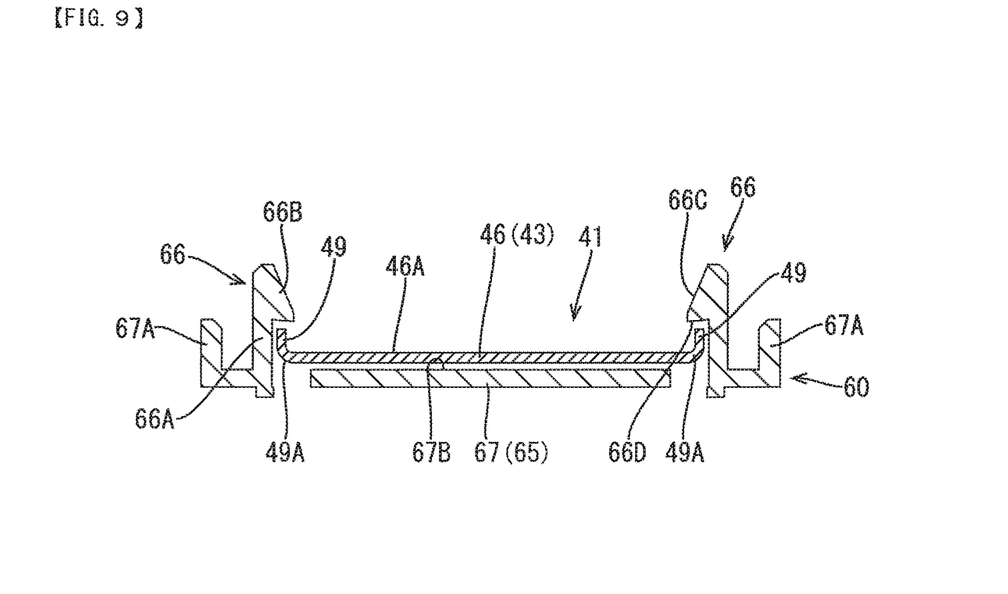
FIG. 9 is a cross-sectional view taken along a line C-C in FIG. 5.
Figure 10:
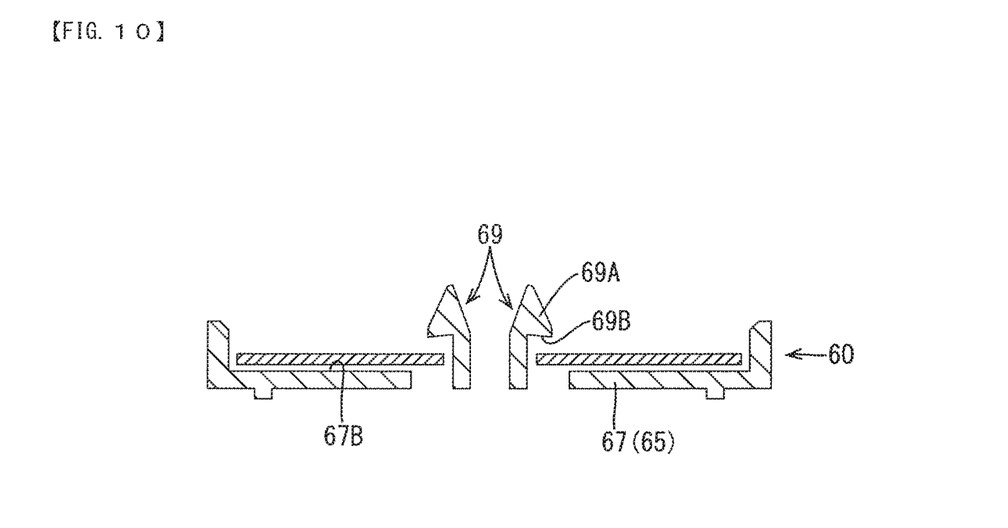
FIG. 10 is a cross-sectional view taken along a line D-D in FIG. 5.

The extension portion 46 is elongated in the front-rear direction to extend from the position of the negative-electrode end bus bar 25N to the position of the bus bar 21 that is located at the front left end, and as illustrated in FIGS. 9 and 10, the plate thickness of the extension portion 46 is set to be extremely small as compared with the width dimension of the extension portion 46 in the left-right direction. Therefore, the extension portion 46 is very thin and tends to flexurally deform in a direction in which side edges of the extension portion 46 approach each other (direction in which the extension portion 46 contracts in the left-right direction).

The L-shaped portion 43B is continuous to the upper edge of the second terminal connecting portion 44, and as a result of the L-shaped portion 43B being continuous to the second terminal connecting portion 44, the L-shaped portion 43B is attached together with the second terminal connecting portion 44 to a first bus bar holding portion 62 of a second protector 60 described below so as to cover the first bus bar holding portion 62 from above.

The insulating protector 40 includes a first protector 50 that holds the plurality of bus bars 21 and the pair of end bus bars 25, and the second protector 60 that holds the pair of external connection bus bars 30. The first protector 50 is an insulating member made of a synthetic resin and includes a protector body 51 that has the shape of a substantially rectangular frame. The inside of the protector body 51 is partitioned with partition walls 53 to provide bus bar holding portions 55 that individually hold the plurality of bus bars 21 and the pair of end bus bars 25.

Each of the bus bar holding portions 55 has a substantially rectangular shape in a plan view, is open at the top and the bottom, and holds a bus bar 21 or an end bus bar 25 therein. The upper opening of the bus bar holding portion 55 has a substantially rectangular shape that is approximately the same as the external shape of a bus bar 21 or an end bus bar 25, and the bus bars 21 are held within the bus bar holding portions 55 by supporting portions 56 that are provided at the bottom of the bus bar holding portions 55.

As illustrated in FIG. 4, the same number of (three in the present embodiment) bus bar holding portions 55 are provided on the left side and the right side of a wiring path 52 that is provided in an approximately central portion of the protector body 51 in the left-right direction and extends in the front-rear direction.

Among bus bar holding portions 55 located on the right side of the wiring path 52 out of the bus bar holding portions 55, a bus bar holding portion 55 that is located at the front right end holds the positive-electrode end bus bar 25P, and two bus bar holding portions 55 that are located on the rear side respectively hold bus bars 21. On the other hand, among bus bar holding portions 55 located on the left side of the wiring path 52 out of the bus bar holding portions 55, a bus bar holding portion 55 that is located at the rear left end holds the negative-electrode end bus bar 25N, and two bus bar holding portions 55 that are located on the front side respectively hold bus bars 21.

Accordingly, the bus bar holding portions 55 of the first protector 50 are arranged in a staggered manner in the front-rear direction on the respective sides of the wiring path 52, and the plurality of power storage elements 71 are serially connected by the bus bars 21 held by the plurality of bus bar holding portions 55 of the first protector 50.

Figure 5:
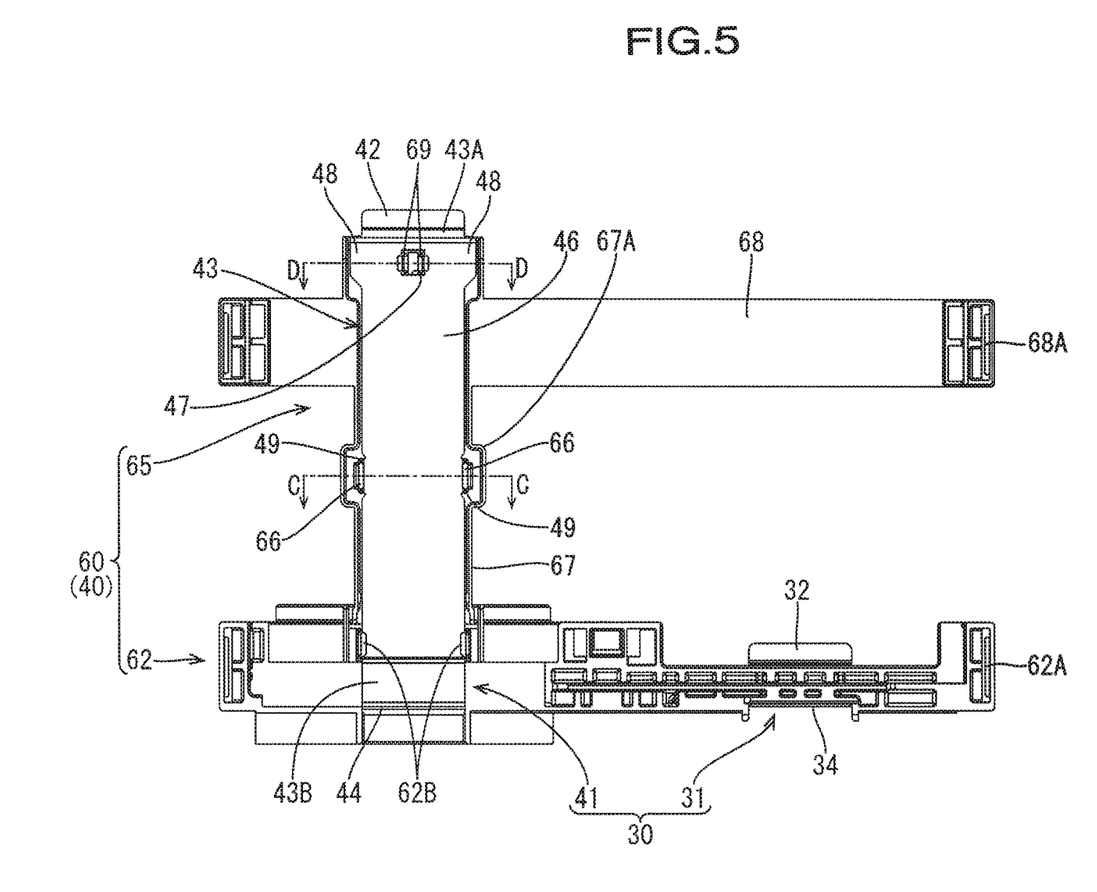
FIG. 5 is a plan view of a second protector to which external connection bus bars are attached.

The second protector 60 is an insulating member made of a synthetic resin and is formed as a member separate from the first protector 50 as illustrated in FIG. 5. The second protector 60 includes the first bus bar holding portion 62 on which a front end portion of the negative-electrode external connection bus bar 41 and the positive-electrode external connection bus bar 31 are placed, and a second bus bar holding portion 65 on which the long linkage portion 43 of the negative-electrode external connection bus bar 41 is placed.

As illustrated in FIGS. 1 and 5, the first bus bar holding portion 62 is elongated in the left-right direction, and as a result of a pair of front-side locking pieces 62A provided in respective end portions of the first bus bar holding portion 62 and non-illustrated to-be-locked portions of the first protector 50 being locked in the up-down direction, the second protector 60 is fixed to the first protector 50.

As illustrated in FIGS. 1 and 5, a pair of bus bar locking pieces 62B are provided on the left side of an approximately central portion of the first bus bar holding portion 62 in the left-right direction. The pair of bus bar locking pieces 62B are located above respective front end side edges of the extension portion 46 in the long linkage portion 43 of the negative-electrode external connection bus bar 41. Therefore, as a result of the pair of bus bar locking pieces 62B and respective front end side edge portions of the extension portion 46 being locked in the up-down direction, a front end portion of the extension portion 46 is kept from moving up relative to the first bus bar holding portion 62. On the right side of the approximately central portion of the first bus bar holding portion 62 in the left-right direction, the positive-electrode external connection bus bar 31 is attached from below and is fixed with a non-illustrated fixing means.

As illustrated in FIGS. 2 and 3, nuts N that are respectively coaxial with the bolt hole 35 in the first terminal connecting portion 34 of the positive-electrode external connection bus bar 31 and the bolt hole 45 in the second terminal connecting portion 44 of the negative-electrode external connection bus bar 41 are attached to respective end portions of the first bus bar holding portion 62 in the left-right direction. The power storage module 10 and the external device are electrically connected by disposing the positive electrode terminal TP and the negative electrode terminal TN provided on the external device on the front faces of these nuts and fastening the fastening bolts BT.

Figure 7:
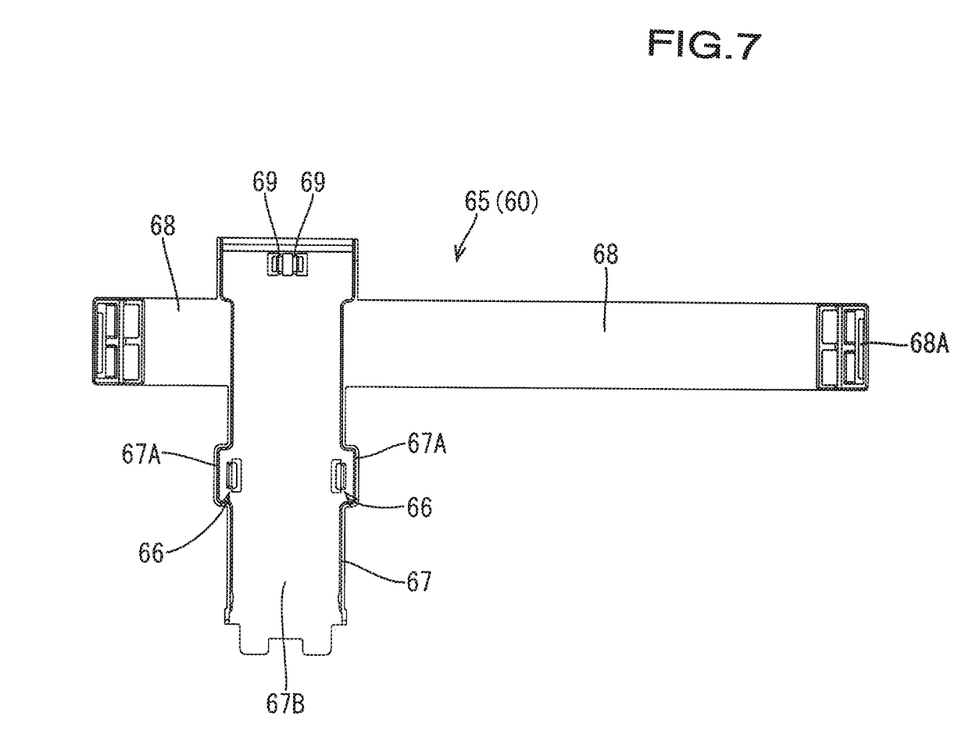
FIG. 7 is a plan view of the second protector.

As illustrated in FIGS. 1, 5, and 7, the second bus bar holding portion 65 is formed as a member separate from the first bus bar holding portion 62 and includes a placement portion 67 on which the extension portion 46 of the negative-electrode external connection bus bar 41 is placed and a pair of fixing pieces 68 that respectively extend left and right from side edges of the placement portion 67 in the left-right direction.

The placement portion 67 has the shape of a plate extending in the front-rear direction from the position of the first bus bar holding portion 62 to the position of the negative-electrode end bus bar 25N. Also, the width dimension of the placement portion 67 in the left-right direction is greater than that of the extension portion 46 of the negative-electrode external connection bus bar 41, and when the extension portion 46 of the negative-electrode external connection bus bar 41 is placed on the placement portion 67, the bus bars 21 and the extension portion 46 are insulated from each other by the placement portion 67.

A pair of fit-locking pieces 69 are provided in a rear end portion of the placement portion 67 at a central portion thereof in the width direction (left-right direction). The pair of fit-locking pieces 69 stand upright from the placement portion 67 and can be elastically displaced in the width direction to approach each other. At distal ends of the fit-locking pieces 69, fitting projections 69A that project in the width direction away from each other are provided, and each fitting projection 69A has a rear-end locking surface 69B that is a lower surface of the fitting projection 69A, faces the placement portion 67 in the up-down direction, and locks the extension portion 46 of the negative-electrode external connection bus bar 41 from above.

Figure 8:
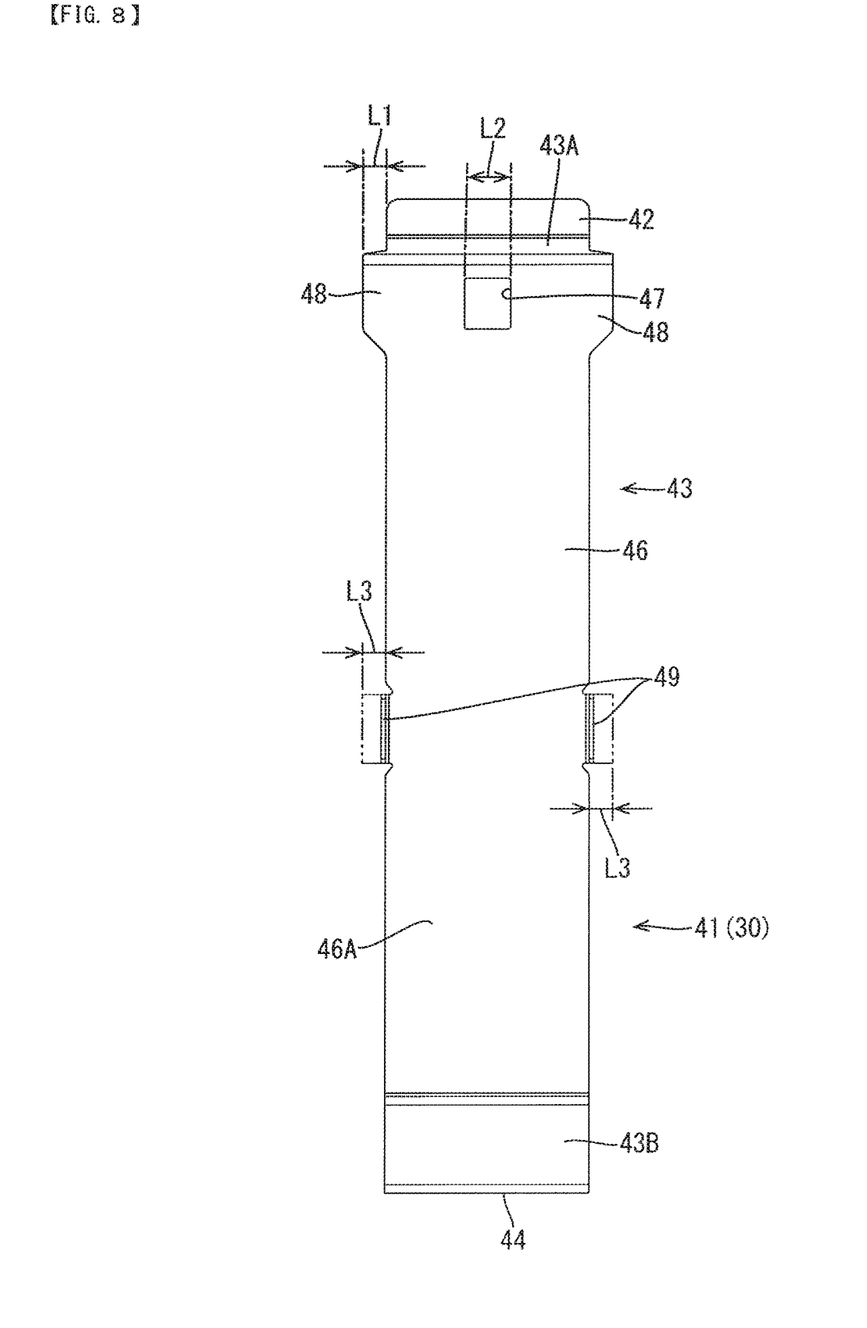
FIG. 8 is a plan view of a negative-electrode external connection bus bar.

On the other hand, a locking hole 47 to which the pair of fit-locking pieces 69 can be fitted from below is provided in the rear end portion of the extension portion 46. The locking hole 47 penetrates through the extension portion 46 in the up-down direction, which is the plate thickness direction, and has a substantially rectangular shape in a plan view as illustrated in FIG. 8. When the negative-electrode external connection bus bar 41 is being attached to the second protector 60, the pair of fit-locking pieces 69 enter the locking hole 47 while being elastically displaced to come up onto the opening edge of the locking hole 47. When the negative-electrode external connection bus bar 41 is attached to its normal position relative to the second protector 60, the rear-end locking surface 69B of the fitting projection 69A of each fit-locking piece 69, which has passed through the locking hole 47, is located on the opening edge of the locking hole 47, and as a result of the rear-end locking surface 69B of the fitting projection 69A and the opening edge of the locking hole 47 being locked in the up-down direction, the rear end portion of the long linkage portion 43 is kept from moving up relative to the second bus bar holding portion 65.

As illustrated in FIG. 8, the extension portion 46 includes protruding portions 48 that protrude in the width direction from respective side edges of the rear end portion thereof. The protruding portions 48 are provided at side edges that are located on respective sides of the part of the extension portion 46 where the locking hole 47 is provided, and the protrusion dimension L1 of each protruding portion 48 is approximately half of the width dimension L2 of the locking hole 47. That is, the area of a widthwise cross section of the part of the extension portion 46 where the locking hole 47 is provided is approximately the same as the area of a widthwise cross section of a part of the extension portion 46 where the locking hole 47 is not provided. Therefore, the area of the widthwise cross section of the extension portion 46 can be kept at at least a predetermined area over the entire length in the extension direction to prevent heat quantity from becoming high in a part of the negative-electrode external connection bus bar 41.

As illustrated in FIGS. 1 and 5, the fixing pieces 68 extend from a rear portion of the placement portion 67 to respective end portions of the first protector 50 in the left-right direction, and a pair of rear-side locking pieces 68A that can be locked with non-illustrated to-be-locked portions of the first protector 50 in the up-down direction are provided in extended end portions of the fixing pieces 68. The pair of rear-side locking pieces 68A are locked to the to-be-locked portions of the first protector 50 together with the pair of front-side locking pieces 62A of the first bus bar holding portion 62 to fix the second protector 60 to the first protector 50.

As illustrated in FIGS. 1 and 5, a pair of locking portions 66 are provided in an approximately central portion of the placement portion 67 of the second holding portion in the front-rear direction, and a pair of extended locking pieces 49 that can be locked with the pair of locking portions 66 in the up-down direction are provided in an approximately central portion of the extension portion 46 of the negative-electrode external connection bus bar 41 in the front-rear direction.

As illustrated in FIGS. 1, 5, and 7, the pair of locking portions 66 are respectively provided in wide portions 67A that are located in the approximately central portion of the placement portion 67 in the front-rear direction and in which the width of the placement portion 67 is increased in the left-right direction. As illustrated in FIG. 9, each of the locking portions 66 includes an elastic piece 66A that extends upward, which is a direction perpendicular to a placement surface 67B of the placement portion 67 on which the extension portion 46 is placed, and a locking projection 66B that is provided at an upper end thereof, which is an extended end of the elastic piece 66A.

The distance between the elastic pieces 66A of the pair of locking portions 66 is set to be approximately the same as the width dimension of the extension portion 46 of the negative-electrode external connection bus bar 41, and each of the elastic pieces 66A can be elastically displaced in the left-right direction, which is a direction along the placement surface 67B.

The locking projections 66B of the pair of locking portions 66 project inward to face each other, and each of the locking projections 66B has an inclined surface 66C that inclines downward and inward and a locking surface 66D that faces the placement surface 67B in the up-down direction.

On the other hand, as illustrated in FIG. 8, the pair of extended locking pieces 49 are continuous with the side edges of the extension portion 46 in the width direction perpendicular to the front-rear direction, which is the extension direction of the extension portion 46, and extend upward, which is a direction perpendicular to a plate surface 46A of the extension portion 46 and away from the extension portion 46, as illustrated in FIG. 9. Therefore, the side edges of the extension portion 46 provided with the pair of extended locking pieces 49 have higher rigidity in the plate thickness direction as compared with side edges that are not provided with the extended locking pieces 49.

Further, a portion of each extended locking piece 49 that is continuous with the extension portion 46 is a bent portion 49A that is bent to have a round corner, and in a laid-out state in which the bent portion 49A is not yet bent, a portion of each extended locking piece 49 that is to extend upward has an extension dimension equal to or less than the protrusion dimension by which the protruding portions 48 protrude from the extension portion 46. FIG. 8 illustrates the extended locking pieces 49 of the negative-electrode external connection bus bar 41 in the laid-out state in which the bent portions 49A are not yet bent, and shows the extension dimension L3 of the extended locking pieces 49 set to be approximately the same as the protrusion dimension L1 of the protruding portions 48.

That is, when the protruding portions 48 provided for maintaining the area of the widthwise cross section of the extension portion 46 are formed through punching or the like, the extended locking pieces 49 can be formed by effectively utilizing portions that would otherwise have been wasted. As a result, wasting of a base material can be reduced as compared with a case where the extended locking pieces are formed from a part of the base material other than portions to be wasted, such as a case where the extension dimension of the extended locking pieces is greater than the protrusion dimension of the protruding portions, and thus the yield of the negative-electrode external connection bus bar 41 can be improved.

Further, the distance between the pair of extended locking pieces 49 is set to be greater than the distance between the locking projections of the pair of locking portions 66, and the length dimension of each extended locking piece 49 in the front-rear direction is set to be greater than the length dimension of the locking portions 66 of the placement portion 67 in the front-rear direction.

Therefore, when the negative-electrode external connection bus bar 41 is being attached to the second protector 60, the bent portion 49A of each extended locking piece 49 comes into contact with the inclined surface 66C of the corresponding locking projection 66B and moves along the inclined surface 66C to elastically displace the elastic pieces 66A outward. When the negative-electrode external connection bus bar 41 is attached to its normal position relative to the second protector 60, as illustrated in FIG. 9, each extended locking piece 49 fits under the locking surface 66D of the locking projection 66B and is disposed along the inside of the elastic piece 66A of the locking portion 66 in the vicinity thereof such that the extended end portion of the extended locking piece 49 and the locking surface 66D of the locking projection 66B are located opposite each other in the up-down direction.

Also, as illustrated in FIGS. 1 and 5, the length dimension of each extended locking piece 49 in the front-rear direction is set to be greater than the length dimension of the locking portion 66 in the front-rear direction, and therefore even when the negative-electrode external connection bus bar 41 is arranged to be slightly displaced in the front-rear direction relative to the placement portion 67 due to manufacturing tolerance or attachment tolerance, the extended end portion of the extended locking piece 49 and the locking surface 66D of the locking projection 66B can be located opposite each other in the up-down direction.

Therefore, it can be ensured that the extended end portion of the extended locking piece 49 and the locking surface 66D of the locking projection 66B are locked in the up-down direction to keep the extension portion 46 from moving up from the placement portion 67 of the second bus bar holding portion 65.

The present embodiment is configured as described above, and the following describes functions and effects of the connection module 20. The extension portion 46 of the negative-electrode external connection bus bar 41 in the present embodiment is elongated in the front-rear direction, and the plate thickness of the extension portion 46 is extremely small as compared with the width dimension thereof in the left-right direction. Therefore, the extension portion 46 of the negative-electrode external connection bus bar 41 tends to flexurally deform in a direction in which side edges in the left-right direction approach each other (direction in which the extension portion 46 contracts in the width direction).

Therefore, for example, in a case where the extension portion 46 is not provided with the pair of extended locking pieces and respective side edge portions of such an extension portion 46 are locked from above with the locking surfaces of the pair of elastic locking pieces, when an external force is applied to press the extension portion 46 in the left-right direction, the extension portion 46 may flexurally deform in the direction in which the side edges in the left-right direction approach each other, and as a result, the side edge portions of the extension portion 46 may largely incline relative to the locking surfaces of the pair of elastic locking pieces and the lock between the locking surfaces and the side edge portions of the extension portion 46 may be released.

However, according to the present embodiment, the extended locking pieces 49 are respectively provided at positions on the extension portion 46 corresponding to the pair of locking portions 66 of the second bus bar holding portion 65. That is, the part of the extension portion 46 in which the pair of extended locking pieces 49 are provided has higher rigidity in the plate thickness direction as compared with the other part of the extension portion 46, and therefore even when an external force is applied to press the extension portion 46 in the left-right direction, for example, upon contact being made with another member while the connection module is being conveyed, the extension portion 46 can be kept from flexurally deforming in the direction in which the side edges in the left-right direction approach each other (direction in which the extension portion 46 contracts in the width direction) and attachability of the negative-electrode external connection bus bar 41 to the insulating protector 40 can be prevented from being impaired. Also, the extended locking pieces 49 can be kept from largely inclining relative to the locking surfaces 66D of the locking portions 66 and the lock between the locking surfaces 66D of the locking portions 66 and the extended locking pieces 49 can be prevented from being released, and therefore the negative-electrode external connection bus bar 41 can be kept from coming off from the insulating protector 40 as a result of flexural deformation of the extension portion 46.

Further, according to the present embodiment, when the negative-electrode external connection bus bar 41 is attached to its normal position relative to the second protector 60, each extended locking piece 49 is disposed along the inside of the elastic piece 66A of the locking portion 66 in the vicinity thereof as illustrated in FIG. 9. Therefore, when the extension portion 46 is to flexurally deform in the direction in which the side edges in the left-right direction approach each other (direction in which the extension portion 46 contracts in the width direction), the extended locking pieces 49 come into contact with the elastic pieces 66A from the inner side, whereby flexural deformation of the extension portion 46 can be prevented. As a result, it is possible to prevent impairment of attachability of the negative-electrode external connection bus bar 41 to the insulating protector 40, and the negative-electrode external connection bus bar 41 can be further kept from coming off from the insulating protector 40.

However, the part of the extension portion 46 in which the pair of extended locking pieces 49 are provided has higher rigidity in the plate thickness direction as compared with the other part of the extension portion 46, and therefore when the negative-electrode external connection bus bar 41 is being attached to the second protector 60, a large external force acts on portions of the second protector 60 and the negative-electrode external connection bus bar 41 that slide relative to each other.

However, according to the present embodiment, when the negative-electrode external connection bus bar 41 is being attached to the second protector 60, the bent portions 49A each having a round corner move along the inclined surfaces 66C of the locking projections 66B of the locking portions 66 to elastically displace the elastic pieces 66A outward. Therefore, as compared with, for example, a case where the bent portions each have an angular corner, the negative-electrode external connection bus bar 41 can be smoothly attached to the second protector 60 and the locking projections 66B of the locking portions 66 can be kept from being damaged. That is, attachability of the negative-electrode external connection bus bar 41 to the insulating protector 40 can be improved and the negative-electrode external connection bus bar 41 can be kept from coming off from the insulating protector 40 as a result of the locking projections 66B of the locking portions 66 being damaged.

Also, according to the present embodiment, the extension dimension L3 of the pair of extended locking pieces 49 extending in the up-down direction is set to be approximately the same as the protrusion dimension L1 of the protruding portions 48 protruding from the extension portion 46.

That is, when the protruding portions 48 provided for maintaining the area of the widthwise cross section of the extension portion 46 are formed through punching or the like, the extended locking pieces 49 are formed by effectively utilizing portions that would otherwise have been wasted. That is, wasting of the material can be reduced as compared with a case where the extended locking pieces are formed from a part of the base material other than portions to be wasted, such as a case where the extension dimension of the extended locking pieces is greater than the protrusion dimension of the protruding portions, and thus the yield of the negative-electrode external connection bus bar 41 can be improved Incidentally, in the present embodiment, unlike the approximately central portion of the extension portion 46 in the front-rear direction, the front end portion of the extension portion 46 is not provided with a pair of extended locking pieces 49 and is kept from moving up by the pair of bus bar locking pieces 62B provided in the first bus bar holding portion 62, and therefore the lock between the bus bar locking pieces 62B and the extension portion 46 may be released as a result of flexure of the extension portion 46. However, in the present embodiment, rigidity in the plate thickness direction is increased in the front end portion of the extension portion 46 by the L-shaped portion 43B formed continuously from the front edge of the extension portion 46 to extend upward, and therefore it is possible to also prevent impairment of attachability of the negative-electrode external connection bus bar 41 to the first bus bar holding portion 62 and prevent a situation in which the lock between the bus bar locking pieces 62B and the extension portion 46 is released as a result of flexure of the extension portion 46.

Further, in the rear end portion of the extension portion 46, the opening edge of the locking hole 47 and the rear-end locking surfaces 69B of the fitting projections 69A of the pair of fit-locking pieces 69 are locked in the up-down direction to keep the rear end portion of the extension portion 46 from moving up relative to the second protector 60, and thus the lock position is switched between the rear end portion of the extension portion 46 and the approximately central portion of the extension portion 46 in the front-rear direction such that the lock position is located at a central portion of the extension portion 46 in the width direction or side edge portions thereof in the width direction. That is, according to the present embodiment, the rear portion of the extension portion 46 is further kept from flexurally deforming in the direction in which the side edges in the left-right direction approach each other (direction in which the extension portion 46 contracts in the width direction) as compared with, for example, a case where the lock position is not switched in the width direction between the rear end portion of the extension portion 46 and the approximately central portion thereof in the front-rear direction. Thus, it is possible to prevent impairment of attachability of the negative-electrode external connection bus bar 41 to the second protector 60 and keep the negative-electrode external connection bus bar 41 from coming off from the second protector 60.

Other Embodiments

The technique disclosed in the present specification is not limited to the embodiment described above with reference to the drawings, and encompasses various alterations such as the following.

(1) In the above-described embodiment, the extension portion 46 of the negative-electrode external connection bus bar 41 is configured such that the opening edge of the locking hole 47 and the pair of fit-locking pieces 69 are locked in the up-down direction in the rear end portion, and the pair of extended locking pieces 49 and the pair of locking portions 66 are locked in the up-down direction in the approximately central portion in the front-rear direction. However, this configuration should not be taken as a limitation, and the extension portion may be configured such that a pair of extended locking pieces and a pair of locking portions are locked in the up-down direction in the rear end portion of the extension portion, and an opening edge of a locking hole and a pair of fit-locking pieces are locked in the up-down direction in the approximately central portion of the extension portion in the front-rear direction.

(2) In the above-described embodiment, the negative-electrode external connection bus bar 41 is configured to be longer than the positive-electrode external connection bus bar 31 in the front-rear direction in order to dispose the second terminal connecting portion 44 of the negative-electrode external connection bus bar 41 in the front end portion of the second protector 60. However, this configuration should not be taken as a limitation, and it is possible to employ a configuration in which the positive-electrode external connection bus bar is longer than the negative-electrode external connection bus bar in the front-rear direction, and the first terminal connecting portion of the positive-electrode external connection bus bar is disposed in the rear end portion of the second protector. That is, an external connection bus bar that is elongated in the front-rear direction may be configured to serve as the positive-electrode external connection bus bar by changing the arrangement of the electrode terminals of the power storage elements.

(3) In the above-described embodiment, the length dimension of the extended locking pieces 49 in the front-rear direction is set to be greater than the length dimension of the locking portions 66 in the front-rear direction. However, this configuration should not be taken as a limitation, and the length dimension of the extended locking pieces in the front-rear direction may be equal to or less than the length dimension of the locking portions in the front-rear direction, so long as the extended locking pieces and the locking portions can be locked in the up-down direction.

LIST OF REFERENCE NUMERALS

20: Connection module
30: External connection bus bar
31: Positive-electrode external connection bus bar
40: Insulating protector
41: Negative-electrode external connection bus bar (an example of "external connection bus bar")
46: Extension portion
47: Locking hole
48: Protruding portion
49: Extended locking piece
49A: Bent portion
66: Locking portion
66A: Elastic piece
66B: Locking projection
66D: Locking surface
67: Placement portion
67B: Placement surface
69: Fit-locking piece
70: Power storage element group
71: Power storage element
73: Electrode terminal
73N: Negative electrode terminal (an example of "electrode terminal")
73P: Positive electrode terminal (an example of "electrode terminal")
L1: Protrusion dimension
L3: Extension dimension

What is claimed is:

1. A connection module configured to be attached to a power storage element group that includes a plurality of power storage elements that each have positive and negative electrode terminals and are arranged side by side, comprising:
an external connection bus bar that includes a plate-shaped extension extending in an arrangement direction of the power storage elements and is configured to be electrically connected to one of the electrode terminals that is located at an end in the arrangement direction of the power storage elements in the power storage element group; and
an insulating protector that holds the external connection bus bar,
wherein the insulating protector includes a placement structure on which the plate-shaped extension is placed and a lock that has a locking surface that faces the placement structure, and
the plate-shaped extension includes an extended lock structure that extends from the plate-shaped extension toward the locking surface of the lock and that is locked with the locking surface in a direction in which the external connection bus bar separates from the insulating protector.

2. A connection module configured to be attached to a power storage element group that includes a plurality of power storage elements that each have positive and negative electrode terminals and are arranged side by side, comprising:
- an external connection bus bar that includes a plate-shaped extension extending in an arrangement direction of the power storage elements and is configured to be electrically connected to one of the electrode terminals that is located at an end in the arrangement direction of the power storage elements in the power storage element group; and
- an insulating protector that holds the external connection bus bar,
- wherein the insulating protector includes a placement structure on which the plate-shaped extension is placed and a lock that has a locking surface that faces the placement structure,
- the plate-shaped extension includes an extended lock structure that extends from the plate-shaped extension toward the locking surface of the lock and that is locked with the locking surface in a direction in which the external connection bus bar separates from the insulating protector,
- wherein the lock includes: an elastic structure that extends from the placement structure in a direction perpendicular to a placement surface of the placement structure and is configured to be elastically displaced in a direction along the placement surface; and a locking projection that includes the locking surface and projects from the elastic structure, and
- the extended lock structure extends along the elastic structure in a direction perpendicular to a plate surface of the plate-shaped extension in a vicinity of the elastic structure.

3. The connection module according to claim 2, wherein the extended lock structure is continuous with a side edge of the plate-shaped extension in a width direction perpendicular to an extension direction of the plate-shaped extension, and
- a portion of the extended lock structure that is continuous with the plate-shaped extension is a bent structure that is bent to have a round corner configured to come into contact with the locking projection of the lock when the external connection bus bar is being attached to the insulating protector.

4. A connection module configured to be attached to a power storage element group that includes a plurality of power storage elements that each have positive and negative electrode terminals and are arranged side by side, comprising:
- an external connection bus bar that includes a plate-shaped extension extending in an arrangement direction of the power storage elements and is configured to be electrically connected to one of the electrode terminals that is located at an end in the arrangement direction of the power storage elements in the power storage element group; and
- an insulating protector that holds the external connection bus bar,
- wherein the insulating protector includes a placement structure on which the plate-shaped extension is placed and a lock that has a locking surface that faces the placement structure,
- the plate-shaped extension includes an extended lock structure that extends from the plate-shaped extension toward the locking surface of the lock and that is locked with the locking surface in a direction in which the external connection bus bar separates from the insulating protector,
- wherein the plate-shaped extension includes a locking hole into which a fit-lock structure provided in the placement structure is fitted and a protrusion that is provided on a side of the locking hole and protrudes in a width direction by a protrusion dimension equal to or greater than a width dimension of the locking hole in the width direction, and
- an extension dimension of the extended lock structure is equal to or less than the protrusion dimension of the protrusion.

* * * * *